United States Patent [19]

Balcar

[11] 4,206,258
[45] Jun. 3, 1980

[54] MULTILAYER FELT BAND CONTAINING CHANNELS PRODUCED BY EXPOSURE TO BEAMS OF LIGHT

[75] Inventor: Cestmir Balcar, Roztoky u Prahy, Czechoslovakia

[73] Assignee: IRAPA Vyvojovy a racionalizacno ustav prumyslu papiru a celulozy, Prague, Czechoslovakia

[21] Appl. No.: 903,928

[22] Filed: May 8, 1978

[30] Foreign Application Priority Data

May 20, 1977 [CS] Czechoslovakia .................... 3328-77

[51] Int. Cl.² .......................... B32B 3/10; B32B 5/02; D04H 1/16; F26B 13/26
[52] U.S. Cl. ........................................ 428/131; 34/95; 34/243 F; 156/252; 156/253; 156/264; 156/272; 156/380; 156/436; 156/516; 162/304; 162/348; 162/358; 162/DIG. 1; 219/121 LM; 264/154; 331/DIG. 1; 428/138; 428/280; 428/282

[58] Field of Search ................ 264/154; 219/121 LM; 156/436, 516, 252, 253, 380, 264, 272; 428/131, 138, 280, 282; 34/243 F, 95; 331/DIG. 1; 162/304, 348, 358, DIG. 1

[56] References Cited

U.S. PATENT DOCUMENTS

| | | |
|---|---|---|
| 3,323,226 | 6/1967 | Beaumont et al. .................... 428/138 |
| 3,594,261 | 7/1971 | Broerman ........................... 428/131 |
| 3,695,988 | 10/1972 | Steigerwald ....................... 428/138 |
| 3,719,736 | 3/1973 | Woodruff ........................... 428/131 |
| 3,979,494 | 9/1976 | Ericson ............................. 428/131 |
| 4,091,137 | 5/1978 | Miller ............................... 428/280 |
| 4,107,367 | 8/1978 | Fekete .............................. 428/282 |

*Primary Examiner*—J. C. Cannon
*Attorney, Agent, or Firm*—Burgess, Ryan and Wayne

[57] ABSTRACT

A multilayer felt band, particularly for paper manufacture consisting of thermoplastic material where at least one layer comprises storage spaces having the shape of channels obtained by melting binding portions of fibers, the channel walls being inclined with respect to the surface of the felt band at angles between 0° to 80°.

11 Claims, 10 Drawing Figures

MULTILAYER FELT BAND CONTAINING CHANNELS PRODUCED BY EXPOSURE TO BEAMS OF LIGHT

BACKGROUND OF THE INVENTION

This invention relates to felt bands and particularly felt bands as used in the paper making industry.

The development of similar felt bands proceeded in recent years from the use of natural fibers to increasing application of synthetic fibers. The application of these fibers enabled development of new technological processes, for instance the technology of needling. The melting, or fusing together of thermoplastic fibers also belongs to these novel technological processes. The new synthetic materials provided improved resistance to abrasion, against the influences of different chemicals, moulds and similar. These materials found their application particularly in the manufacture of felt bands in paper making for dewatering, dehumidifying and drying, for manufacture of materials for filtering and insulating, and similar applications. In the case of felt bands for the manufacture of paper there are particularly needled felt bands having an internal structure where the supporting tissue or netting is connected with a needled fleece of fibers which are not feltable.

The supporting tissue in such a structure serves here as a supporting medium and as means for achievement of the required strength and stability of dimensions, whereby the loops of said supporting tissue can serve as storage spaces for the working medium, for instance water. This support, however, has some undesirable properties. New types of felt bands have therefore been developed which have few or no wefts and recently felt bands having practically no supporting tissue and represent a layer obtained by a fiber fleece reinforced by needling, have been developed. The stability of dimensions and required strength of these materials is obtained both by intensive needling and by chemical impregnation or melting together. By needling, bonds are formed in a fleece of fibers which are not feltable, which provide the strength of the fleece and which connect the individual layers of fiber fleeces together. The chemical impregnation of the felt band also provides the necessary strength and stability of dimensions. Internal bonds between thermoplastic fibers can also be created by fusing them together in order to strengthen the structure of the felt band. These felt bands are spatially arranged so that the fibers are oriented in the plane of the surface of the felt band and the bonds are oriented in a direction substantially perpendicular to this plane. In case of a chemical working of the felt band, bonds are created by bonding the fibers of the fleece with some synthetic resin in the whole structure of the felt band. Drawbacks of these methods of making felt bands are that no storage spaces for the working medium are provided and furthermore that they adversely influence some of the required properties as perviousness, strength, elasticity, clogging, etc.

SUMMARY OF THE INVENTION

It is an object of this invention to eliminate these drawbacks and to provide a felt band, which has sufficient strength, elasticity, perviousness and capability to absorb humidity. The invention relates to a multilayer felt band comprising thermoplastic material in the shape of individual fibers, fiber layers, impregnation of fibers or as a coating of individual fibers. This felt band has at least in one layer storage spaces of the shape of channels determined by fused bonding places, the walls of which are at an angle of 0° to 80° with respect to the surface of the felt band in at least one layer.

An object of this invention is furthermore to provide a multilayer felt band comprising thermoplastic material in the form of individual fibers as above described, where at least one layer has channels with a trapezoidal cross section.

Also herein disclosed is a method of manufacture of a multilayer felt band comprising thermoplastic material in the form of individual fibers, fiber layers, impregnation of fibers or coatings of fibers, where storage spaces of the shape of channels are molten out by radiation generated by a quantum generator of light radiation acting on a felt band moving along a rotating roll, whereby the radiation beam is against a tangent to the surface of the rotating roll in the crossing point of the axis of the beam with the surface of the rotating roll at an angle 0° to 90°.

Another feature of this invention provides a method of manufacture of a multilayer felt band comprising thermoplastic material in the form of fibers, fiber layers, impregnation of fibers or coatings of individual fibers as described, where storage spaces of the shape of channels are molten out in at least one layer of the felt band by radiation generated by a quantum generator of light radiation acting within the region of a contact line of connected layers of the felt band.

Still another feature of this invention provides a method of manufacture of a multilayer felt band comprising thermoplastic material in the form of individual fibers, fiber layers, impregnation of fibers or coatings of individual fibers as described, where storage spaces of the shape of channels are molten out in individual layers of the felt band by radiation generated by a quantum generator of light radiation of different diameter of the radiation beam.

Still another feature of this invention provides an arrangement for execution of the method of manufacture of a multilayer felt band comprising thermoplastic material in the form of individual fibers, fiber layers, impregnation of fibers or coatings of individual fibers as described comprising a group of at least a couple of rolls for guiding and connecting the individual layers of the felt band determining at least one connecting line, whereby at least one of the rolls is provided with a mantle with openings and with a reflection mirror displaceably situated inside the roll. At the face side of this roll a quantum generator of light radiation is provided.

The storage spaces of the channels in individual layers can be interconnected according to the present invention, that is they may communicate with each other, creating thus in the felt band a continuous system of storage spaces promoting the dewatering. Channels of trapezoidal cross section are widening conically toward the lower surface of the felt band. A thus made felt band can be very advantageously used where large amounts of water have to be removed. The object of this invention includes however also a felt band, where storage spaces formed in individual layers of the felt band create a separate system i.e. they are not interconnected with storage spaces of adjacent layers. Such a felt band prevents a back-sucking on of water into the paper and is particularly advantageous to be used on the second and third press of a paper making machine and generally for slow operating paper making machines.

The storage spaces of the shape of channels according to this invention are molten out in individual layers of the felt band by radiation beams generated by a quantum generator of light radiation acting on the layer of the felt band at a certain angle. The melting out of storage spaces takes thereby place in the course the layer of the felt band is taken along by a rotating roll, possibly near the contact line between both rolls. Thus the melting out of the storage spaces is accomplished at dynamic conditions, in the course of compressing and extending the layer of the felt band and in the course of connection of layers. The rolls are thereby advantageously heated. This process leads to a creation of strong and elastic bonds between fibers at the place of their melting together, to a stronger and more elastic connection of layers and thus to a higher strength and stability of dimensions of the felt band. By selection of the distance of the place of action of the radiation beam on the layer of the felt band from the connecting line it is possible to influence to a certain degree the density of the structure of the wall of the storaage space and thus the capability of storing of water by the felt band.

One or more quantum generators of light radiation (lasers) can be used for forming the storage spaces in the felt band. The quantum generators can act by their radiation in the region of the connection line of connected layers either directly or by way of some layer. The number, situation and shape of the storage spaces is determined by the position and relative movement of a layer or layers of the felt band respectively and of corresponding parts of the quantum generator of light radiation. These conditions are also controlled by a continuous or intermittent operation of the quantum generator and by applied rasters and diaphragms. The diameter of the radiation beam can be adjusted by focussing.

In addition to already mentioned advantages, the invention solves also the problem of suitably oriented storage spaces for the working medium in the felt band, thereby substantially improving the efficiency of the felt band. The felt band according to this invention will have in addition to a higher elasticity and strength also a better stability of dimensions, it will be less clogged and in case of its application there will be a substantially lower return humidifying of the paper.

DESCRIPTION OF DRAWINGS

The method and arrangements for making felt bands according to this invention is in the following described on hand of attached drawings, where.

DESCRIPTION OF PREFERRED EMBODIMENTS

Figure 1:
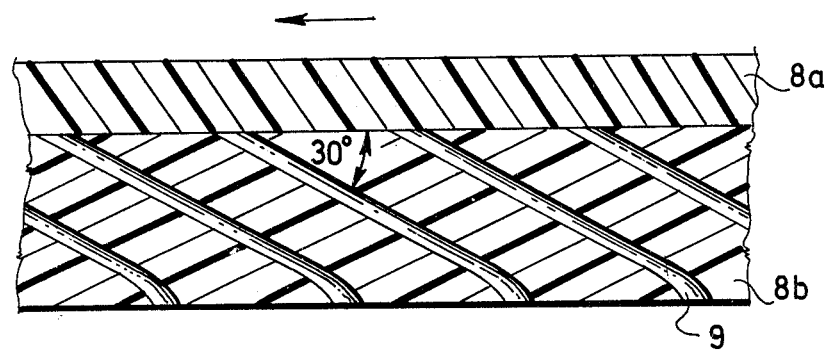
FIG. 1 is a cross section of a felt band with two layers, FIG. 2 a side view showing the connecting of both layers and forming of storage spaces, FIG. 3 a cross section of a felt band with four layers, FIG. 4 the corresponding side view showing their connecting and forming of storage spaces, FIG. 5 a cross section of a felt band with two layers, FIG. 6 a corresponding axonometric view showing again the arrangement of storage spaces, FIG. 7 a cross section of a felt band with three layers, FIG. 8 the corresponding side view showing their connection and forming of storage spaces, FIG. 9 a side view showing the connection of two layers and the forming of storage spaces, FIG. 10 a cross-section of a felt band with two layers produced by the connection.
Figure 2:
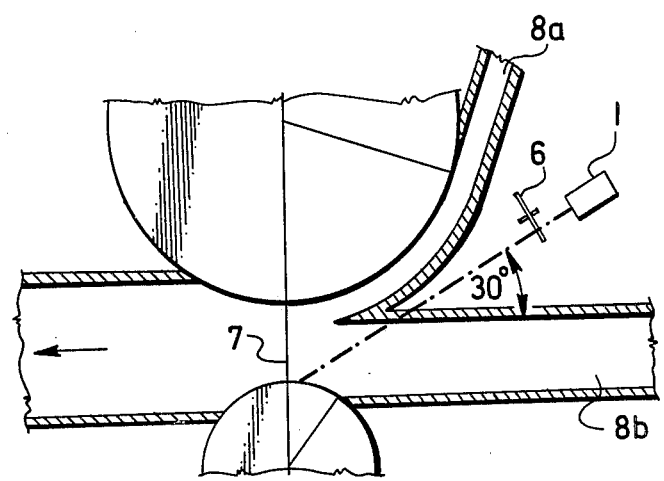

The felt band according to FIGS. 1 and 2 has an upper layer 8a facing the paper and a lower layer 8b. Both layers are composed of a mixture of polyester and polyamide fibers at a ratio 1 to 2. The individual layers 8a,8b have been made on a carding machine and strengthened by needling. The lower layer 8b of the felt band has storage spaces 9 of the shape of channels oriented at an angle of 30° with respect to the surface of the felt band. The channels are oriented parallel to the longitudinal axis of the felt band and pass from the surface of the lower layer toward the center in the direction of movement of the felt band. The channels have been melted out of the lower layer 8b of the felt band by radiation generated by a laser 1 situated in front of the connecting line 7 of the connected layers 8a,8b of the felt band so that the light beam impinges on the layer 8b of the felt band at a 30° angle. The beam acts on the moving layer 8b of the felt band over a rotating diaphragm 6 and performs simultaneously a transverse movement across the width of the felt band. The described felt band is particularly suitable to be applied on presses with full rolls.

Figure 3:
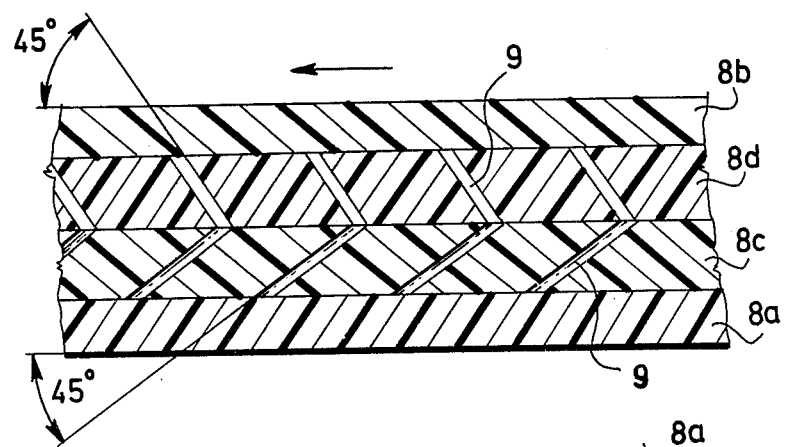
Figure 4:
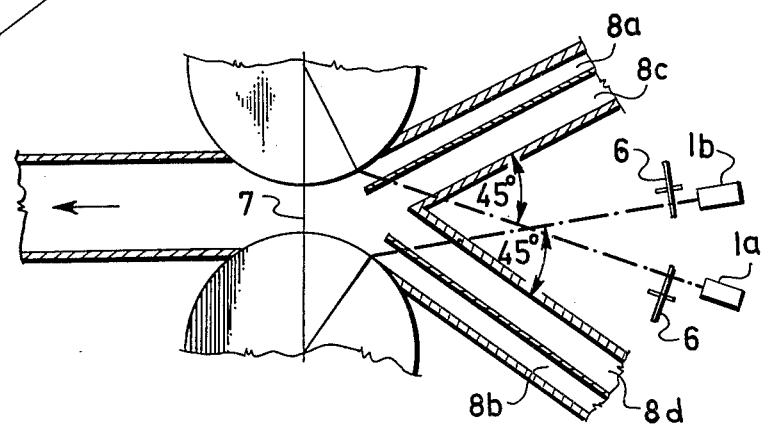

The multilayer felt belt according to FIGS. 3 and 4 is composed of four layers 8a,8b,8c,8d. All layers are made of a mixture of polyester and polyamide fibers at a ratio 1 to 4. The storage spaces 9 of the shape of channels are oriented at an angle 45° against the surface of the felt band and are situated in both middle layers 8c,8d of the felt band so that channels of one layer are at an angle 90° to channels of the other layer. The felt band is made so that both first layers 8a,8c previously strengthened by needling are connected at the connecting line with the other two layers 8d,8b, also previously strengthened by needling. In the zone of the connecting line 7 the radiation generated by two quantum generators 1a,1b situated in front of the connecting line 7 act on the layers through a rotating diaphragm 6 so that the radiation beams generated by both generators cross each other.

Figure 5:
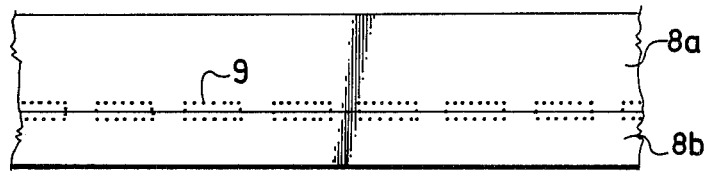
Figure 6:
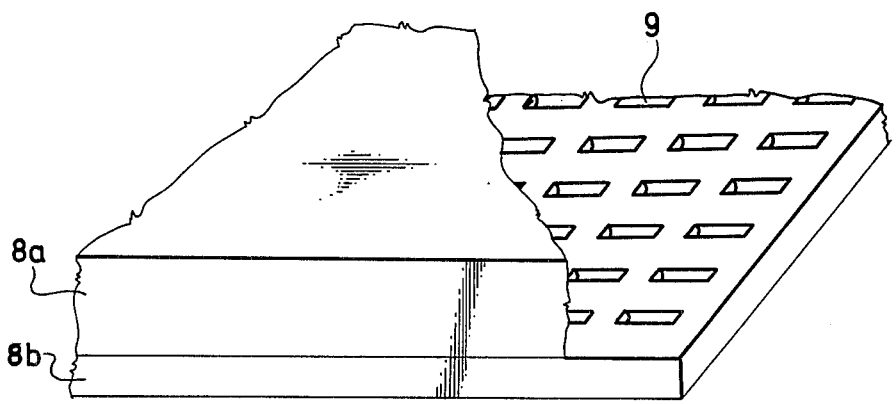

The multilayer felt band according to FIGS. 5 and 6 is composed of an upper layer 8a and a lower layer 8b. Both layers are made of polyamide fibers. The lower layer 8b represents about one third of the thickness of the felt band. The individual layers of the felt band are made on a carding machine and strengthened by needling. At the boundary of the upper layer 8a and the lower layer 8b storage spaces 9 of the shape of channels are provided which are parallel to the axis of the felt band in the longitudinal direction so that they form parallel rows, whereby channels of each row are mutually separated by gaps.

Figure 7:
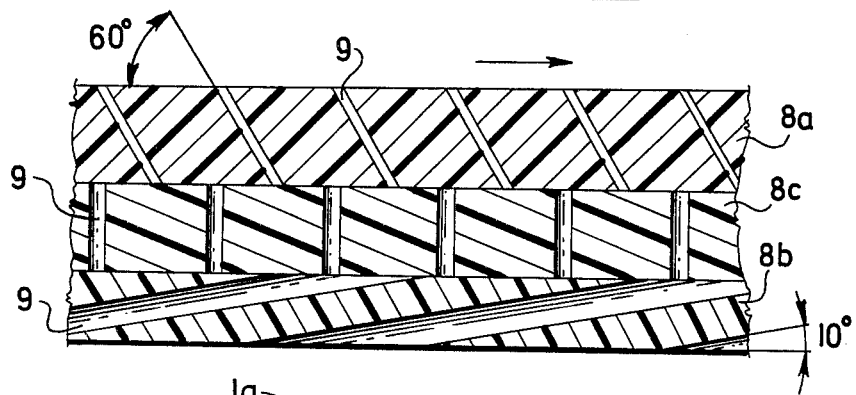
Figure 8:
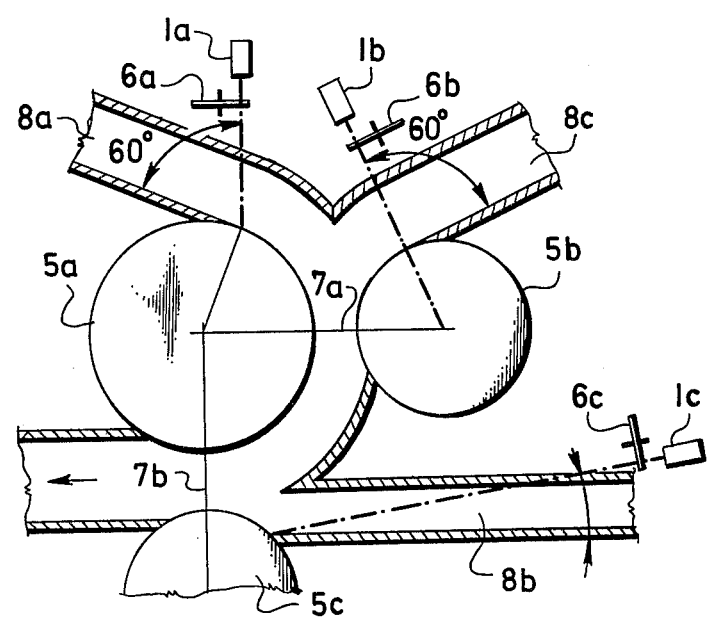

The multilayer felt band according to FIGS. 7 and 8 is composed of three layers 8a,8b,8c. Each layer contains a mixture of polyester and polyamide fibers at the ratio 1 to 3 and is strengthened by needling. The upper layer 8a is provided with storage spaces 9 of the shape of channels oriented at the angle 60° against the surface of the layer whereby the channel passes from the surface of the felt band toward its center in direction of the supposed movement of the felt band in the paper making machine. The middle layer 8c of the felt band is provided with storage spaces 9 of the shape of channels perpendicular to the surface of the layer. The lower layer 8 is provided with storage spaces 9 of the shape of channels oriented at the angle 10° against the surface of the layer, whereby the channel passes from the surface of the felt band toward its center against the supposed direction of movement of the felt band in the paper making machine. The supposed direction of movement of the felt band is indicated in the drawing by an arrow. The channels in the individual layers 8a, 8c, 8b have different diameters, which are at the ratio 1 to 2 to 4 from the upper to the lower layer. The felt band is made of the individual layers so that the upper layer 3a and the middle layer 8c are guided toward the connecting line 7 between two rolls 5a,5b. Two generators 1a,1b of light radiation are situated in front of the connecting line 7a so that the beam generated by generator 1a is with the surface of the upper layer 8a at the angle 60° and the beam generated by generator 1b with the middle layer 8c at the angle 90°. To thus arranged layers the lower layer 8b of the felt band is joined at the connecting line 7b and the generator 1c situated above this layer acts with its radiation beam in the region of the connecting line 7b, whereby this radiation beam is at the angle 10° against the lower layer 8b. The radiation beams generated by generators 1a,1b,1c pass over rotating diaphragms 6a, 6b,6c whereby the respective part of the quantum generator enables a movement of the beam along the whole width of the felt band. The thus made felt band is particularly suitable for removal of large amounts of water.

Figure 9:
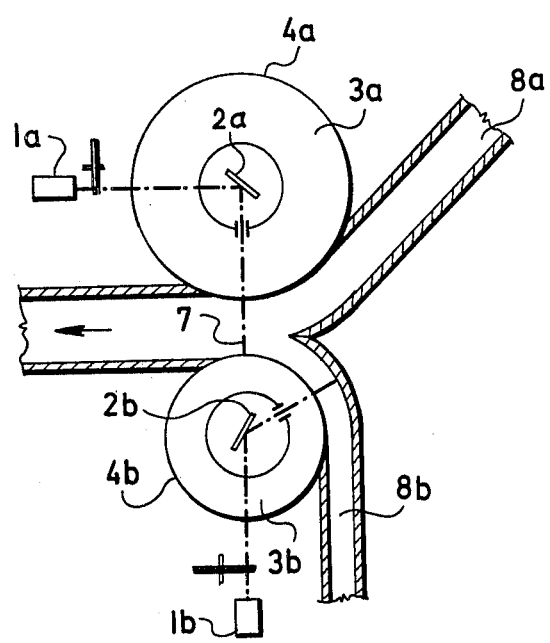
Figure 10:
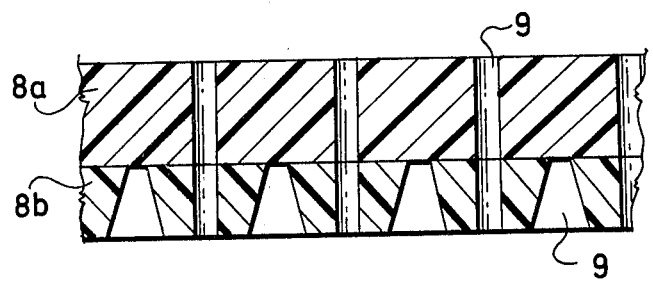

The multilayer felt band according to FIGS. 9 and 10 is composed of two layers 8a and 8b. Both layers consist of polyamide fibers. The lower layer 8b is provided with storage spaces 9 of the shape of channels with trapezoid cross section with an axis perpendicular to the surface of the felt band. The upper layer 8a and the lower layer 8b are thereby interconnected by storage spaces 9 of the shape of channels perpendicular to the surface of the felt band.

The channels 9 in the lower layer 8b are concially widening, so that their walls are against the surface of the felt band at an angle different from 90°. These channels have been made under dynamic conditions at the connecting line 7, thus securing their stable elastic wall. The connecting line 7 is determined by two rolls 3a,3b provided with mantles 4a,4b with openings. A reflecting mirror 2a is situated inside the roll 3a and a reflecting mirror 2b inside the roll 3b. The storage spaces 9 have been melted out in the lower layer 8b at dynamic conditions by a quantum generator 1b of light radiation situated near the roll 3b. The radiation of generator 1b acts over a diaphragm 6b. The storage spaces 9 of the shape of channels interconnecting the upper layer 8a and the lower layer 8b have been melted out at the connecting line 7 by radiation generated by the quantum generator 1a situated at the roll 3a via a rotating diaphragm 6b.

I claim:

1. A multilayer felt band comprising fibers of thermoplastic material, at least one layer thereof having storage spaces of the shape of channels defined by fused fibers, the walls of said channels in at least one layer being oriented with respect to the major surfaces of the felt belt at an angle between zero and 80°.

2. A multilayer felt band as claimed in claim 1, wherein the storage spaces in at least one layer have a trapezoidal cross section.

3. A multilayer felt band, comprising:
 a plurality of adjacent mutually banded layers,
 each layer having two generally parallel major surfaces and comprising a non-woven web of fibers comprising thermoplastic material,
 at least one of said layers having a multiplicity of generally parallel channels extending between the major surfaces thereof, the walls of said channels comprising fused thermoplastic material, said channels being inclined with respect to said major surfaces at an angle 0 in the range of $0 < 0 \leqq 90°$.

4. The band according to claim 3, wherein said channels have a trapezoidal cross-section.

5. The band according to claim 3, wherein said band comprises four layers including two interior layers each having a multiplicity of said channels therein, channels of one interior layer communicating with adjacent channels of the other interior layer to form composite channels having sharp bends therein.

6. The band according to claim 3, wherein said band comprises three layers including an interior layer, a first exterior layer on one side of said interior layer, and a second exterior layer on the other side of said interior layers, each of said layers having said channels therein, the channels of said interior layer being substantially normal to the major surfaces thereof, the channels of said exterior layers being mutually obliquely oriented.

7. The band according to claim 3, wherein said layers comprise a mixture of polyester and polyamide fibers.

8. A process of manufacture of a multilayer felt band comprising fibers, wherein at least a portion thereof comprises thermoplastic material, by forming storage spaces of the shape of channels in at least one layer of the felt band, the walls of said channels in said at least one layer being oriented at an angle between zero and 80° with respect to the surface of the felt band, said storage spaces being formed by melting out by radiation generated by a quantum generator of light radiation acting on a layer of the felt band taken along on a roating roll, whereby the radiation beam is inclined with respect to a tangent to the surface of the rotating roll, at the place the radiating beam strikes the roll, at an angle between zero and 90°.

9. The process as claimed in claim 8, wherein the storage spaces of the shape of channels in individual layers are melted out by radiation beams of different diameter, generated by quantum generators of light radiation.

10. A process for manufacturing a multilayer felt band from a plurality of individual layers each having generally parallel major surfaces and comprising a nonwoven web of fibers comprising thermosplastic material, comprising the steps of:
 providing a beam of intense light radiation of sufficient intensity to melt channels through at least one of said layers;
 moving said one layer across the path of said beam to cause said beam to melt a multiplicity of generally parallel channels through said one layer at an angle in the range of 0 to 80 degrees with respect to the major surfaces thereof; and
 thereafter disposing said one layer with a major surface thereof contiguous with a major surface of another of said individual layers.

11. An arrangement for manufacturing a multilayer felt band comprising fibers of thermoplastic material, with storage spaces of the shape of channels in at least one layer of the felt band, comprising at least two rotating rolls adapted for guiding a connecting individual layers, at least one of said rolls being provided with a hollow mantle having openings therein, a reflecting mirror situated inside said mantle and adapted to be displaced within said mantle, and a quantum generator of light radiation situated near the face of said roll.

* * * * *

UNITED STATES PATENT OFFICE
CERTIFICATE OF CORRECTION

Patent No. 4,206,258　　　　　　　　　Dated　June 3, 1980

Inventor(s)　Cestmir Balcar

It is certified that error appears in the above-identified patent and that said Letters Patent are hereby corrected as shown below:

In the title page, under "Assignee" information: "racionalizacno' should be --racionalizacni--.

Column 5, line 36: "concially" should be --conically--.

Column 6, lines 33-34: "roating" should be --rotating--.

Signed and Sealed this

Twenty-first Day of October 1980

[SEAL]

Attest:

SIDNEY A. DIAMOND

Attesting Officer　　Commissioner of Patents and Trademark